(12) United States Patent
Ammar et al.

(10) Patent No.: US 10,384,598 B2
(45) Date of Patent: Aug. 20, 2019

(54) VEHICLE AMBIENT LIGHT SYSTEM EMPLOYING A LIGHT GUIDE

(71) Applicant: Ford Global Technologies, LLC, Dearborn, MI (US)

(72) Inventors: Ali Ammar, Dearborn, MI (US); Steven J. Antilla, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 15/357,495

(22) Filed: Nov. 21, 2016

(65) Prior Publication Data

US 2018/0043823 A1 Feb. 15, 2018

Related U.S. Application Data

(60) Provisional application No. 62/375,251, filed on Aug. 15, 2016.

(51) Int. Cl.
| | |
|---|---|
| *F21V 8/00* | (2006.01) |
| *F21V 3/00* | (2015.01) |
| *B60Q 3/00* | (2017.01) |
| *F21V 5/04* | (2006.01) |
| *B60Q 3/217* | (2017.01) |
| *B60Q 3/64* | (2017.01) |
| *B60R 13/02* | (2006.01) |
| *G02B 6/32* | (2006.01) |

(52) U.S. Cl.
CPC ............ *B60Q 3/217* (2017.02); *B60Q 3/64* (2017.02); *B60R 13/0243* (2013.01); *F21V 3/00* (2013.01); *F21V 5/04* (2013.01); *G02B 6/0008* (2013.01); *G02B 6/32* (2013.01); *B60Q 2500/10* (2013.01); *B60R 13/0206* (2013.01); *B60R 2013/0287* (2013.01)

(58) Field of Classification Search
CPC .. B60Q 3/62; B60Q 3/64; B60Q 3/217; F21V 2200/00; F21V 5/04; F21V 3/00; B60R 3/65; B60R 13/0243; B60R 13/0206; G02B 6/0008
See application file for complete search history.

(56) References Cited

U.S. PATENT DOCUMENTS

| | | | |
|---|---|---|---|
| 4,840,339 A * | 6/1989 | Grogan | ............... B60R 13/0206 248/205.2 |
| 5,309,798 A | 5/1994 | Markwart et al. | |
| 5,735,171 A | 4/1998 | Moote et al. | |
| 6,070,998 A * | 6/2000 | Jennings | ............... B60Q 1/2669 362/100 |
| 6,217,201 B1 * | 4/2001 | Hulse | ................... B60Q 1/0011 362/489 |

(Continued)

*Primary Examiner* — Tracie Y Green
(74) *Attorney, Agent, or Firm* — Vichit Chea; Price Heneveld LLP (57) ABSTRACT

A vehicle light system is provided herein. The light system includes a trim member defining an aperture. A light guide is disposed within the aperture. The light guide has a proximal portion, a distal portion, and a body portion between the proximal and distal portions. The proximal portion includes a connector portion. A lens is integrally formed with the light guide and is disposed at a distal portion of the light guide. A connector is disposed over the connector portion of the light guide. The connector is operably coupled to a housing having a light source.

15 Claims, 9 Drawing Sheets

(56) References Cited

U.S. PATENT DOCUMENTS

| | | | | |
|---|---|---|---|---|
| 6,572,280 B2 * | 6/2003 | Hurt | ............... | G02B 6/421 |
| | | | | 385/14 |
| 6,848,818 B2 * | 2/2005 | Huizenga | ............ | B60Q 1/2669 |
| | | | | 362/501 |
| 7,237,933 B2 * | 7/2007 | Radu | ............... | B29C 45/14778 |
| | | | | 296/146.7 |
| 7,407,203 B2 * | 8/2008 | Huizenga | ............... | E05B 77/06 |
| | | | | 292/347 |
| 7,607,809 B2 * | 10/2009 | Misawa | ............ | B60Q 1/2669 |
| | | | | 362/487 |
| 7,635,210 B2 * | 12/2009 | Metros | ............... | B60Q 1/2669 |
| | | | | 296/146.1 |
| 9,016,914 B2 * | 4/2015 | Ukai | ............... | B60Q 3/51 |
| | | | | 362/488 |
| 2006/0092649 A1 * | 5/2006 | Bynum | ............... | B60Q 3/51 |
| | | | | 362/488 |

* cited by examiner

VEHICLE AMBIENT LIGHT SYSTEM EMPLOYING A LIGHT GUIDE

CROSS-REFERENCE TO RELATED APPLICATION

This patent application claims benefit to U.S. Provisional Patent Application No. 62/375,251, which was filed on Aug. 15, 2016, entitled "VEHICLE AMBIENT LIGHT SYSTEM." The aforementioned related application is hereby incorporated by reference in its entirety.

FIELD OF THE INVENTION

The present disclosure generally relates to vehicle light systems, and more particularly, to vehicle light systems that provide ambient and/or feature lighting within a vehicle.

BACKGROUND OF THE INVENTION

Ambient illumination of vehicle features offers a unique and attractive viewing experience. It is therefore desired to implement such structures in automotive vehicles for various lighting applications.

SUMMARY OF THE INVENTION

According to one aspect of the present invention, a vehicle light system is disclosed. The light system includes a trim member defining an aperture. A light guide is disposed within the aperture. The light guide has a proximal portion, a distal portion, and a body portion between the proximal and distal portions. The proximal portion includes a connector portion. A lens is integrally formed with the light guide and is disposed at a distal portion of the light guide. A connector is disposed over the connector portion of the light guide. The connector is operably coupled to a housing having a light source.

According to another aspect of the present invention, a vehicle connector is disclosed. The vehicle connector includes a bottom section defining a first opening. A top section defines a second opening. The second opening has a diameter that is less than the first opening. An elongated section is disposed between the bottom section and the top section. A slot is defined by the connector and extends from the first opening to the second opening.

According to yet another aspect of the present invention, a vehicle light system is disclosed. The light system includes a housing defining a light output window having a light output window surface therein. A light guide having a connector portion is disposed within the light output window and outwardly of the light output window surface. A connector defining a second opening is operably coupled to the housing. The connector portion is disposed inwardly of second opening.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
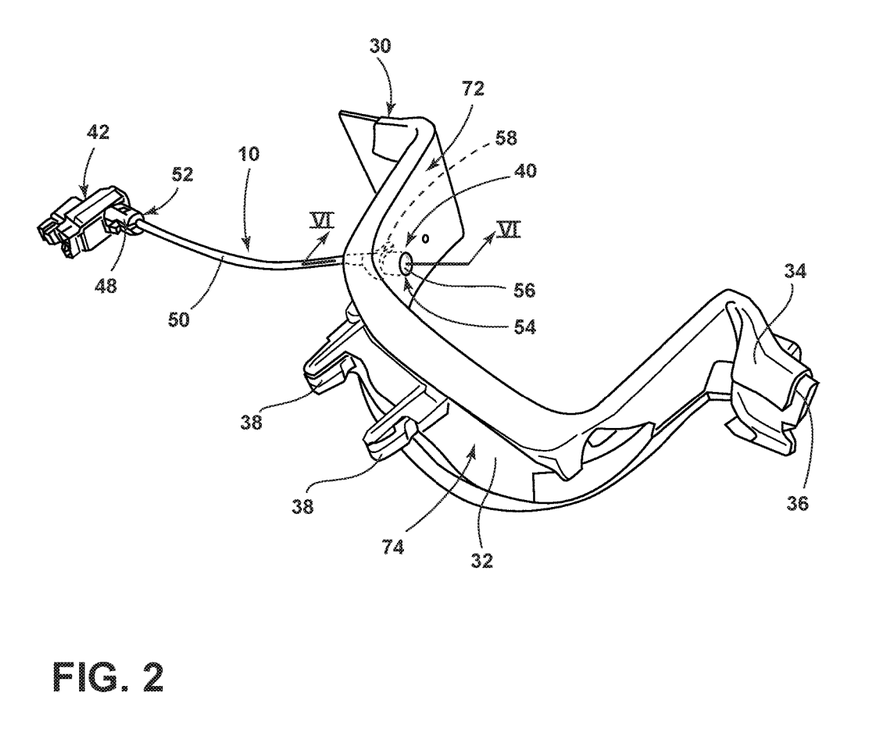
FIG. 2 is a perspective view of the light system, according to one embodiment, wherein a feature of the door trim panel defines an aperture through which a light guide is inserted.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a light system for a vehicle. The light system may advantageously employ a light guide that is integrated into a trim panel of the vehicle to provide ambient and/or feature lighting. In some embodiments, the light guide is configured from a flexible material.

Figure 1:
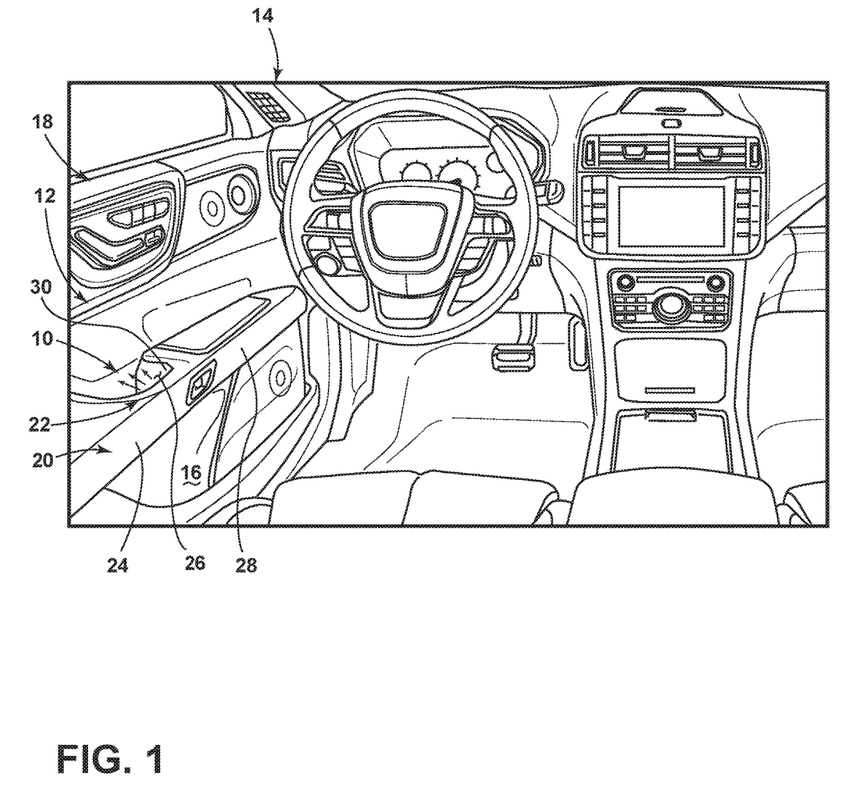
FIG. 1 is a perspective view of a vehicle interior having a light system incorporated into a door trim panel, according to one embodiment.

Referring to FIG. 1, a light system 10 is disposed within a door trim panel 12 of a vehicle 14 and is configured to illuminate a desired location within an interior 16 of the vehicle 14. The door trim panel 12 may be configured as a trim panel that conceals a door structure of a vehicle door 18. The light system 10 may provide accent and/or feature lighting and may be disposed proximate to one or more vehicle features 20, such as a grab handle assembly 22, disposed within the interior 16 of the vehicle 14. It will be understood that the light system 10 may additionally, and/or alternatively, be disposed proximately to any other feature 20 within the interior 16 of the vehicle 14 without departing from the scope of the present disclosure.

With further reference to FIG. 1, an armrest 24 may be formed from a substrate and an outer panel 28 (or skin) that is coupled to the door trim panel 12. The armrest 24 may additionally be configured as a pelvic bolster in some embodiments. The armrest 24 and door trim panel 12, when coupled to one another, may define a void 26 that allows an occupant's hand to pass therethrough for utilizing the grab handle assembly 22. The outer panel 28 is generally attached to the hard substrate to give the texture and appearance desired by customers. A foam layer may be disposed between the substrate and the outer panel 28 to provide or enhance the softness of the armrest 24. The outer panel 28 may be formed from a soft material, such as a thermoplastic elastomer or any other material known in the art. As will be described in greater detail below, the grab handle assembly 22 may include a portion of the armrest 24, a trim member 30, and the light system 10. It will be understood that the general configuration of the door trim panel 12 and the particular configurations of the armrest 24 and grab handle assembly 22 are shown for illustrative purposes only and are not intended as being limiting. Thus, the grab handle assembly 22 may be in any practicable configuration within the vehicle 14. Moreover, the light system 10 may be used in conjunction with any other feature 20 within the vehicle 14 and/or be configured as a stand-alone component that provides ambient lighting and/or feature lighting within the vehicle 14.

Referring to FIG. 2, the trim member 30 having the light system 10 attached thereto is illustrated, according to one embodiment. The trim member 30 has an A-surface 72 that is disposed in an occupant touch zone of the vehicle 14. The term "touch zone," as used in the present disclosure, defines a portion of the interior 16 of the vehicle 14 (FIG. 1) that is capable of being contacted by an occupant of the vehicle 14 while the occupant is seated within the vehicle 14 and/or using a feature 20 of the vehicle 14 that is configured to be contacted by the occupant. As used herein, the term "A-surface" 72 refers to a surface of any component within the vehicle 14 that is visible and/or contactable by an occupant of the vehicle 14 when the component is in an assembled state. Contrastingly, the term "B-surface" 74 refers to a surface of any component within the vehicle 14 that is concealed and/or non-contactable by an occupant of the vehicle 14 when the component is in an assembled state.

The trim member 30 includes a substrate 32 and a cover material 34. The cover material 34 may include any material commonly known in the art. By way of non-limiting examples, some of the known materials include cloth, leather, polymers, and/or elastomers that are capable of use in vehicle trim applications. Polymer trim materials may include a flexible closed cell polymer skin material such as polyvinyl, polyvinyl chloride (PVC), thermoplastic olefin (TPO), or thermoplastic urethane (TPU). Additionally, a foam backing 36, which may be manufactured from a variety of foam materials, may be disposed between the substrate 32 and the cover material 34. The foam backing 36 may be polyethylene, polypropylene, polyurethane, or polystyrene foam in some of the embodiments that include the foam backing 36.

A pair of retention clips 38 may be made of lightweight, generally rigid material having resilient characteristics. An example of such a material for the retention clips 38 is spring steel, or the like. It will be appreciated that any suitable material that allows the retention clips 38 to be positioned on the trim member 30 for subsequent attachment of the trim member 30 to the vehicle 14 may be utilized. In the illustrated embodiment, the retention clips 38 are first affixed to the trim member 30, which is then secured to the armrest 24 of the vehicle 14.

Figure 3:
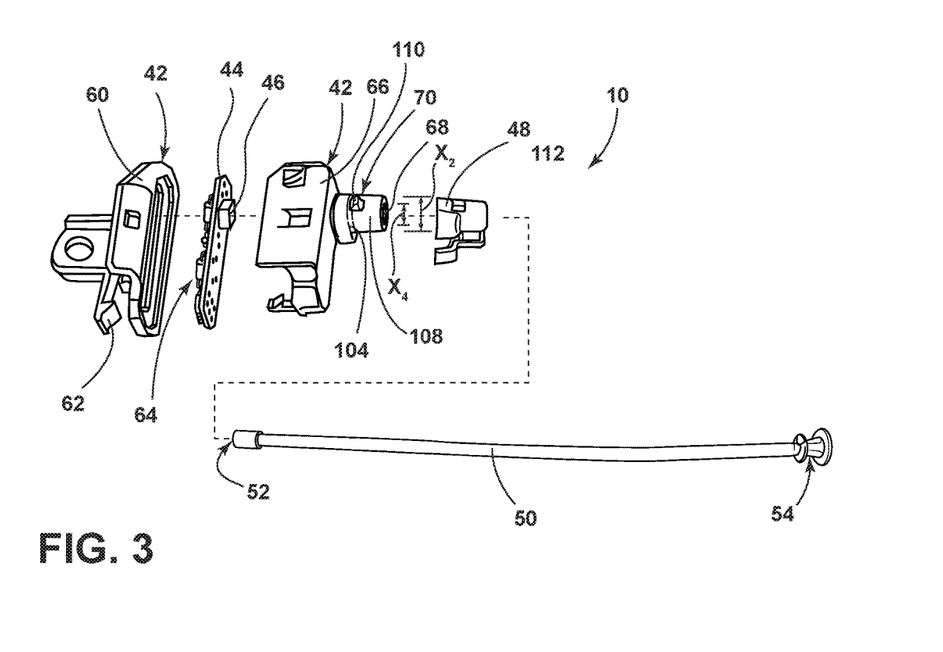
FIG. 3 is an exploded view of the light system, according to one embodiment.

As illustrated in FIG. 2, the trim member 30 defines an aperture 40 through which a light guide 50 is inserted. A light source housing 42 encapsulates a printed circuit board (PCB) 44 (FIG. 3) and a light source 46 (FIG. 3). A connector 48 is configured to attach the light guide 50 to the housing 42. The light guide 50 is configured to accept light emitted from the light source 46 through a proximal portion 52 of the light guide 50. The emitted light is transmitted through the light guide 50 and exits the light guide 50 through a distal portion 54 thereof. More specifically, the distal portion 54 may include a lens 56 for directing the emitted light in any desired direction. As will be discussed in greater detail below, the light guide 50 may be flexible and/or soft to the touch such that contact with the distal portion 54 of the light guide 50, or the lens 56, by an occupant of the vehicle 14 may go unnoticed while utilizing the grab handle assembly 22.

With further reference to FIG. 2, an integrally formed deformable attachment mechanism 58 is also formed in the distal portion 54 of the light guide 50. The integrally formed deformable attachment mechanism 58 is configured such that the lens 56 of the light guide 50 is maintained in a desired position within the aperture 40.

Referring to FIG. 3, the light source housing 42 may be formed from two pieces that may be removably attached to one another. However, in alternate embodiments, the housing 42 may be configured from any number (i.e. one or more) pieces without departing from the scope of the present disclosure. A base portion 60 of the housing 42 may have an integrally formed compression clip 62 that is configured to maintain the housing 42 in a substantially constant position within a concealed portion of the door trim panel 12 (FIG. 1) when the vehicle door 18 (FIG. 1) is assembled (i.e., between the B-surface of the door trim panel 12 and an exterior vehicle structure that forms the outer surface of the vehicle door 18 (FIG. 1)).

The PCB 44 is disposed on the base portion 60, or otherwise disposed within the housing 42, and contains a controller 64 having control circuitry including light source drive circuitry for controlling activation and deactivation of the light source 46. The PCB 44 may be any type of circuit board including, but not limited to, any flexible PCB and/or rigid PCB. In alternate embodiments, the controller 64 may be disposed externally from the housing 42 without departing from the scope of the present disclosure.

The light source 46 may be disposed on the PCB 44 and may include any form of light source. For example, fluorescent lighting, light emitting diodes (LEDs), organic LEDs (OLEDs), polymer LEDs (PLEDs), solid-state lighting, laser lighting, or any other form of lighting device configured to emit light may be utilized.

A top portion 66 of the housing 42 is configured to cover (or partially cover) the PCB 44 and/or the light source 46. The top portion 66 of the housing 42 may also define a light output window 68. The light output window 68 allows light emitted from the light source 46 to exit the housing 42 therethrough and may be configured in any desired geometry.

With further reference to FIG. 3, the proximal end of the light guide 50 is configured to be disposed within and/or operably coupled with the light output window 68 of the housing 42. Accordingly, in some embodiments, the light output window 68 and the proximal portion 52 of the light guide 50 may have a substantially similar geometrical cross section. As discussed herein, the proximal portion 52 of the light guide 50 is configured to accept light emitted from the light source 46 and transmit the emitted light to the distal portion 54 of the light guide 50.

The connector 48 is configured to surround the proximal portion 52 of the light guide 50 and attach to the top portion 66 of the housing 42. The connector 48 is attached to the housing 42 through a snap feature 70; however, any type of attachment feature may be utilized. Alternatively, the connector 48 may be integrally formed with the housing 42. When assembled, the connector 48 is configured to maintain the proximal portion 52 of the light guide 50 within the light output window 68.

Figure 4:
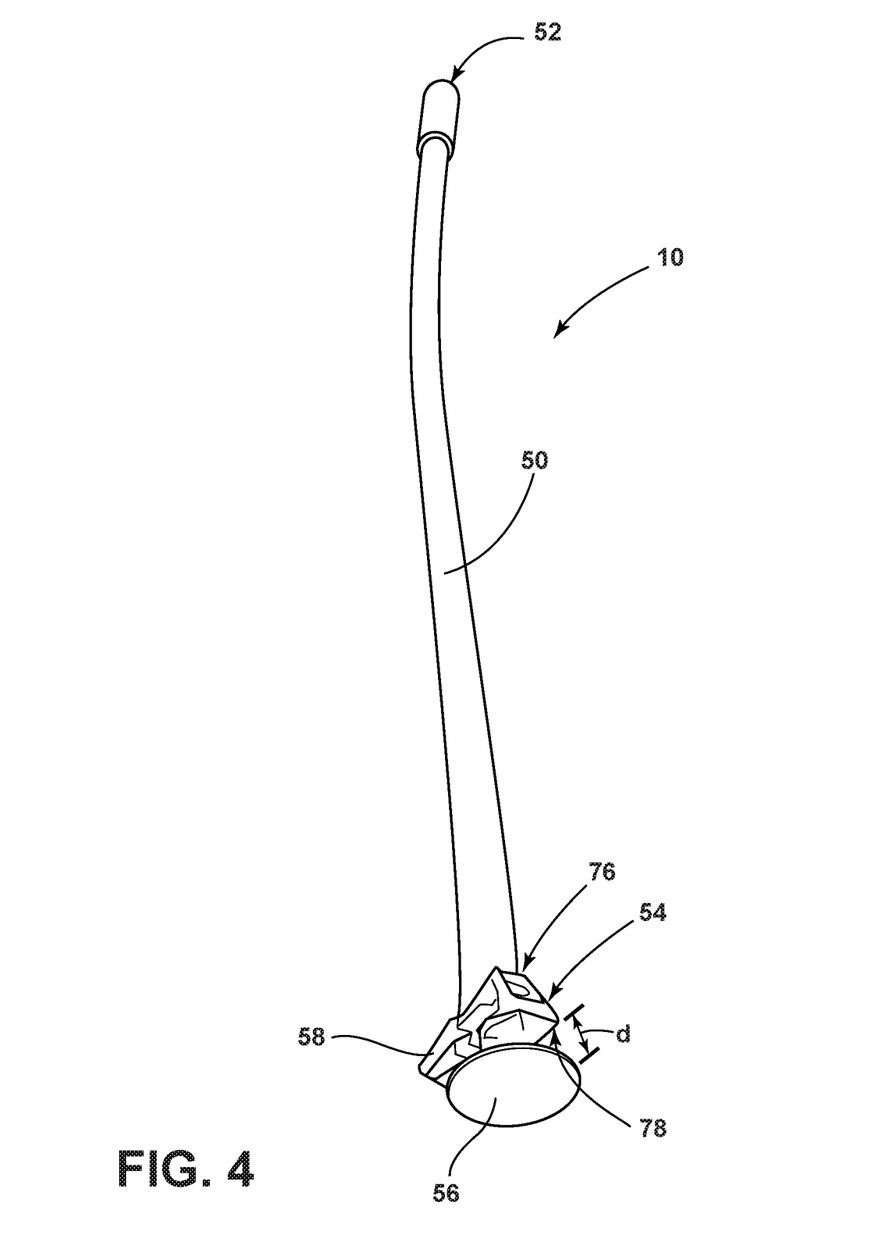
FIG. 4 is a perspective view of the light guide, according to one embodiment.

Referring to FIG. 4, the light guide 50 may be a substantially transparent or translucent guide suitable for transmitting light (e.g., light emitted from the light source 46). The light guide 50 may be a flexible light guide, wherein a suitable flexible material is used to create the light guide 50. Such flexible materials include, but are not limited to, urethanes, silicone, flexible polycarbonate, optical grade flexible polypropylene, thermoplastic polyurethane (TPU), optical grade elastomeric, and/or any other flexible mold in clear (MIC) material or mixtures. The light guide 50 may be referred to as a light pipe, a light plate, a light bar or any other light carrying or transmitting substrate made from a clear or substantially translucent material. The light guide 50 may be formed through an injection molding process, or any other manufacturing process known in the art.

The flexible light guide 50 may have Durometer hardness below approximately 110 Shore A. According to one embodiment, the light guide 50 has a Durometer hardness of less than or equal to approximately 70 Shore A. According to an alternate embodiment, the light guide 50 has a Durometer hardness that is less than or equal to approximately 60 Shore A.

As discussed herein, the light guide 50 also includes the integrally formed lens 56. The lens 56 is disposed proximately to the A-surface 72 of the trim member 30 and is configured to direct light emitted from the light source 46 towards a desired location and/or feature 20 disposed within the vehicle 14. The flexibility and/or soft touch of the lens 56 allows for tactile homologation with minimal (or no) sharp edges (such as, but not limited to, flash from injection molding the light guide 50) and/or rigid materials that are contactable and/or noticeable by an occupant of the vehicle 14.

With further reference to FIG. 4, the distal portion 54 of the light guide 50 includes the integrally formed deformable attachment mechanism 58 and the integrally formed lens 56. The deformable attachment mechanism 58 is configured to pass through the aperture 40 defined by the trim member 30 (FIG. 2). The lens 56, however, is of a larger cross section than the deformable attachment mechanism 58 such that the lens 56 does not pass through the aperture 40 without a large amount of force and/or tension. Moreover, the deformable attachment mechanism 58 and the lens 56 are spaced apart from one another along the light guide 50 at a predefined distance d. The predefined distance d may be substantially equal to, or less than, the combined thickness of the trim member 30 (i.e., the substrate 32 and the cover material 34 FIG. 2)). Due to the deformable attachment mechanism 58 and lens 56 being disposed on opposing sides of the trim member 30, the light system 10 may be maintained in a constant position within the aperture 40 through compressive and/or elastic force. Moreover, as described above, the light guide 50, and hence the integrally formed lens 56, may be formed from a soft touch material such that an occupant of the vehicle 14 is unable to easily an/or quickly differentiate contact with the lens 56 and/or the light system 10 from contact with the cover material 34 and/or the A-surface 72 of the trim member 30 when utilizing the grab handle assembly 22 disposed within the vehicle 14. For purposes of the present disclosure, "easily differentiate" is defined by an occupant's ability to touch the lens 56 and know that the lens 56 is projecting light therefrom without visible inspection of the lens 56.

According to one embodiment, the light guide 50, the lens 56, and the attachment mechanism 58 may all be formed as a single component, from a single material, and/or in a single manufacturing process. For example, the light guide 50, the lens 56, and the attachment mechanism 58 may all be integrally formed through an injection molding process. As discussed above, the light guide 50 may be formed from an optical grade thermoplastic elastomer or any other material known in the art.

The deformable attachment mechanism 58 may be of any other practicable geometry. As illustrated, the deformable attachment mechanism 58 has a substantially rectangular geometry with a rearward portion 76 having a smaller diameter than a forward portion 78 to assist in insertion of the deformable attachment mechanism 58 through the aperture 40.

The integrally formed lens 56 disposed on the distal portion 54 of the light guide 50 may be formed in any manner to direct light in a desired direction and/or towards a desired feature 20 of the vehicle 14. For example, the lens 56 may be configured as a Fresnel lens, a pillow optic, and/or any other type of lens or optic that is configured to disperse, concentrate, and/or otherwise direct light emitted from the light source 46 therethrough in any desired manner.

The lens 56, according to one embodiment, may be configured as a concave lens structure. As light exits the lens 56, the light may be substantially uniformly dispersed to all directions because of light dispersion characteristics of the concave lens structure. Therefore, the light guide 50 can achieve light guiding and a uniform light dispersion effect while saving the fabrication cost, so that prior-art drawbacks such as light output non-uniformity, a high cost, a dramatic loss of light energy, and a low utilization value in production can be eliminated. Thus, the light guide 50 provided herein, in some embodiments, is capable of improving the light dispersion effect of the light guide plate and product quality while increasing design flexibility and industrial applicable value thereof. However, it will be understood that any other geometry of lens 56 may be utilized, such as a convex lens, without departing form the teachings provided herein.

In operation, the proximal portion 52 of the light guide 50 is inserted through the aperture 40 from the A-surface 72 of the trim member 30 (FIG. 2). As the attachment mechanism 58 contacts the aperture 40, the attachment mechanism 58 is resiliently deformed until the attachment mechanism 58 is substantially disposed on an opposing side of the trim member 30 from the lens 56. The proximal portion 52 of the light guide 50 is then operably, and/or optically, coupled with the light source 46 (FIG. 3).

Figure 5:
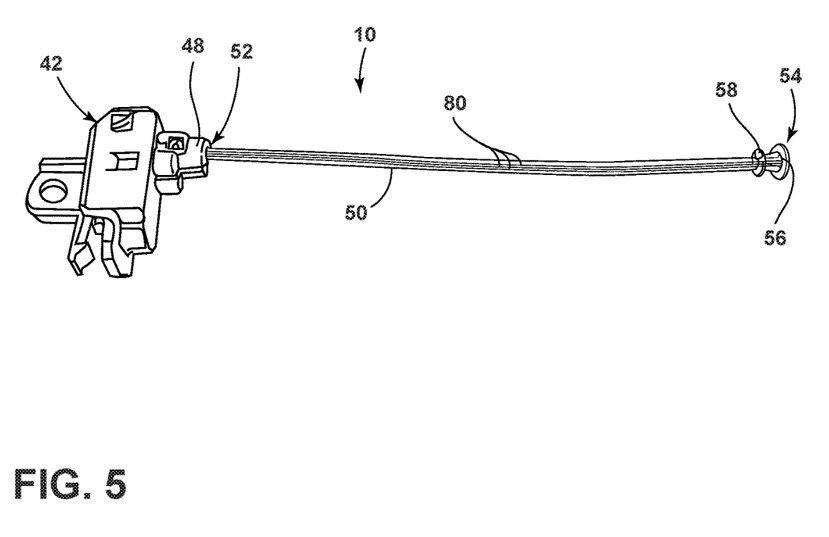
FIG. 5 is a perspective view of the light system have one or more optical fibers, according to one embodiment.

Referring to FIG. 5, the light system 10 may include one or more optical fiber strands 80 that may be encapsulated within the light guide 50. Alternatively, one or more optical fiber strands 80 may be used in place of the light guide 50 and the deformable attachment mechanism 58 and the lens 56 may be coupled to the one or more optical fiber strands 80 or integrally formed with the one or more optical fiber strands 80 during any forming, or manufacturing, process known in the art. The one or more optical fiber strands 80, like the light guide 50, may be flexible to allow for placement of the light system 10 into many locations within the vehicle 14 and/or to assist in assembly of the light system 10 during production of the vehicle 14. To increase the amount of light outputted from the light guide 50, the light source 46 may be configured as a laser diode that is optically coupled with the one or more optical fiber strands 80 and/or the light guide 50 in any of the embodiments provided herein.

Figure 6A:
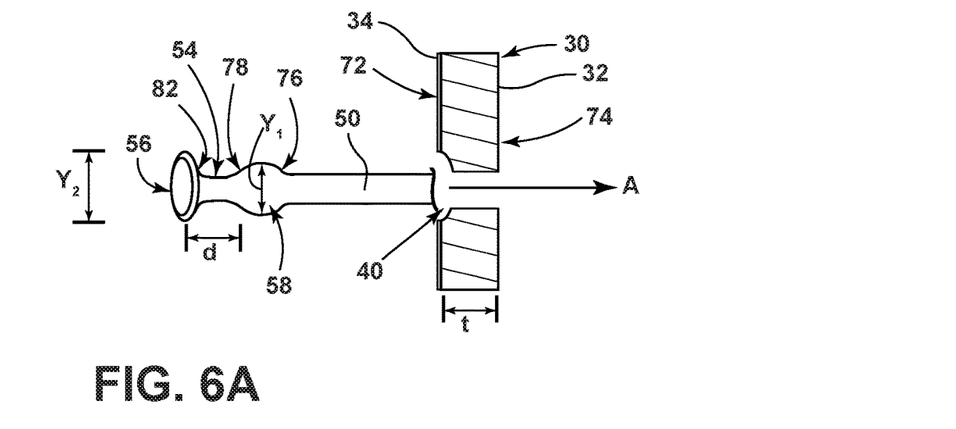
FIG. 6A is a perspective view of the light guide prior to insertion through the aperture of the feature, according to one embodiment.
Figure 6B:
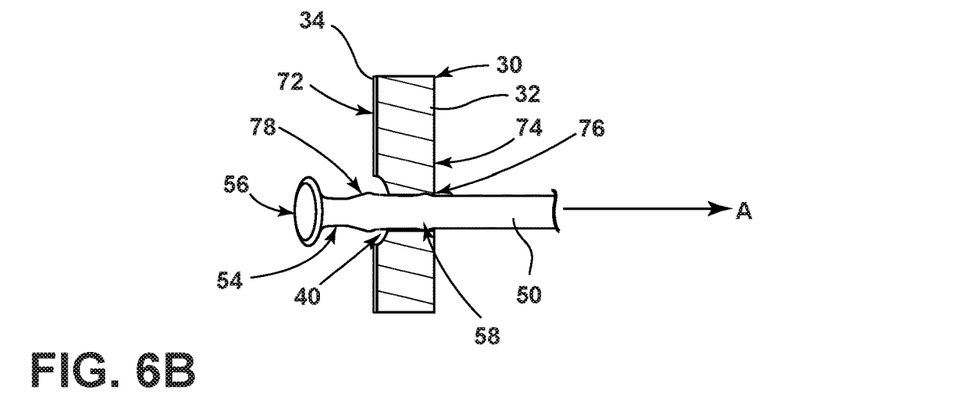
FIG. 6B is a perspective view of the light guide of FIG. 6A partially inserted into the aperture.
Figure 6C:
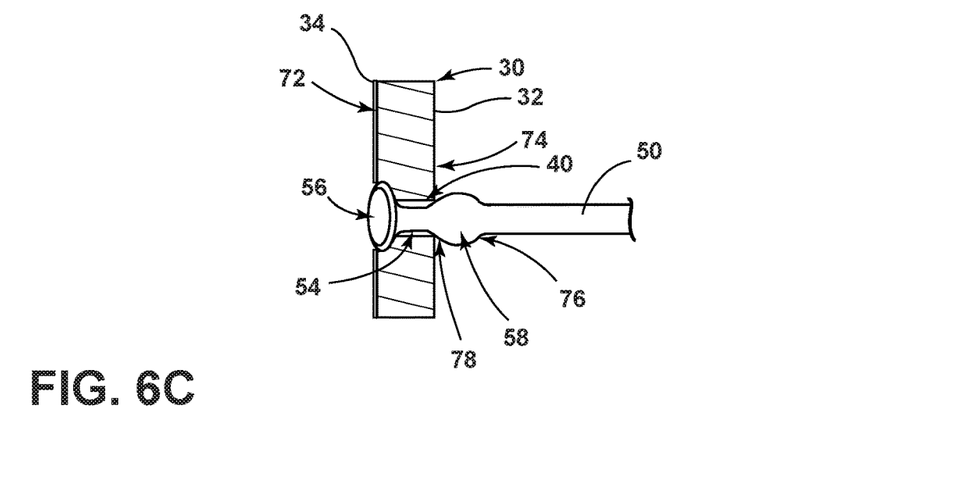
FIG. 6C is a perspective view of the light guide of FIG. 6A disposed within the aperture.

Referring to FIGS. 6A-6C, a cross-sectional view of the light guide 50 taken along the line VI-VI of FIG. 2 illustrating a method of installing the light system 10 into the trim member 30 is exemplarily shown, according to one embodiment. As shown in FIG. 6A, the light guide 50 is initially inserted through the trim member 30 from the A-surface 72 towards the B-surface 74 in the direction of arrow A. As the light guide 50 is slid through the aperture 40, as shown in FIG. 6B, the deformable attachment mechanism 58, which has a first diameter $y_1$, is resiliently deformed. Once the deformable attachment mechanism 58 substantially passes through the aperture 40, as shown in FIG. 6C, the deformable attachment mechanism 58 substantially returns to its original shape.

Once the deformable attachment mechanism 58 substantially returns to its original shape, the light guide 50 is compressively retained within the aperture 40 due to the lens 56 having a second diameter $y_2$ contacting the A-surface 72 and the deformable attachment mechanism 58 contacting the B-surface 74. Accordingly, the distance d between the forward portion 78 of the deformable attachment mechanism 58 and a rearward portion 82 of the lens 56 may be substantially equal to the thickness t of the trim member 30.

As illustrated in FIGS. 6A-6C, the aperture 40 may have a varied width (e.g., chamfered) that may substantially correspond to the rearward portion 82 of the lens 56 such that the light guide 50 may be securely disposed and/or flushly mounted within the aperture 40. Moreover, the distal portion 54 of the light guide 50 may be disposed in a position that is forwardly of, substantially flushly with, or rearwardly of the A-surface 72 of the trim member 30 based on the shape of the aperture 40 and/or the shape of the rearward portion 82 of the lens 56.

Figure 7A:
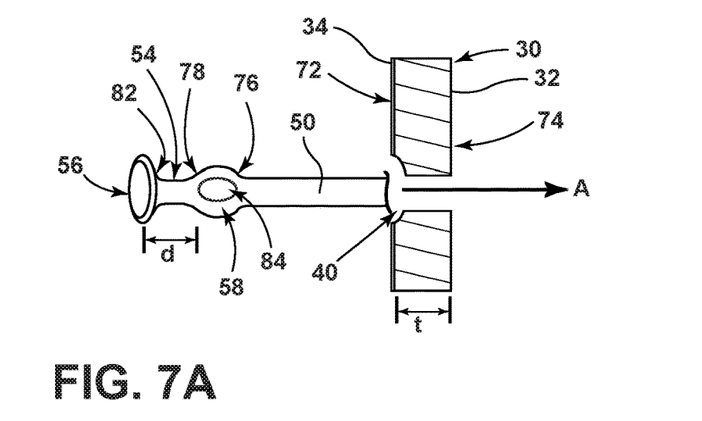
FIG. 7A is a perspective view of the light guide prior to insertion through the aperture of the feature, according to an alternate embodiment.
Figure 7B:
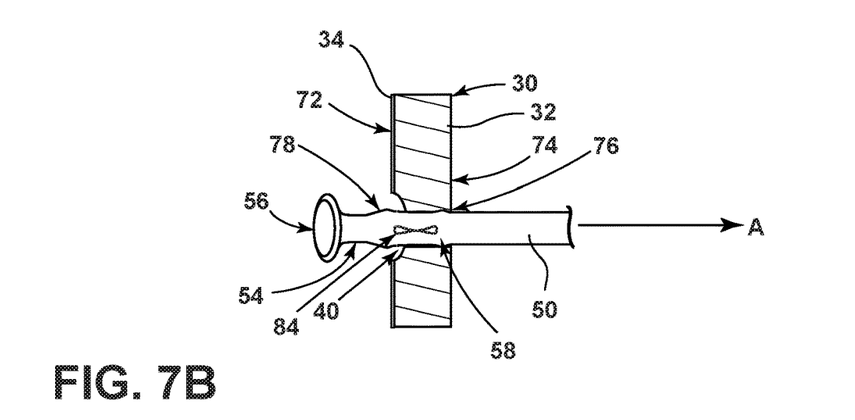
FIG. 7B is a perspective view of the light guide of FIG. 7A partially inserted into the aperture.
Figure 7C:
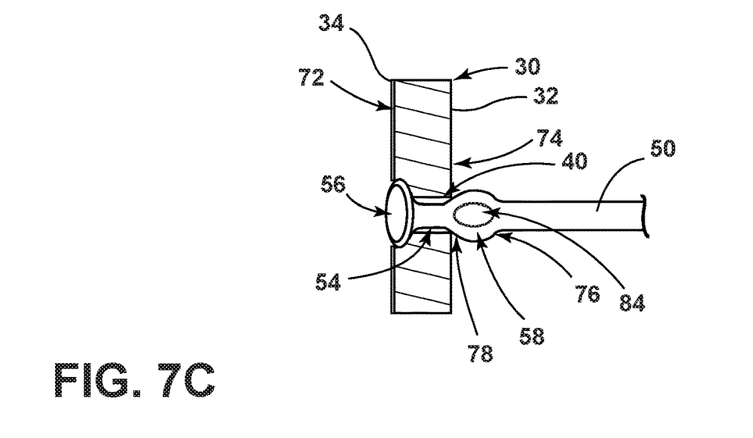
FIG. 7C is a perspective view of the light guide of FIG. 7A disposed within the aperture.

Referring to FIGS. 7A-7C, a cross-sectional view of the light guide 50 taken along the line VI-VI of FIG. 2 illustrating a method of installing the light system 10 into the trim member 30 is exemplarily shown, according to an alternate embodiment. As illustrated in FIGS. 7A-7A, the deformable attachment mechanism 58 defines an orifice 84 in a central portion thereof. With the orifice 84 in the central portion, the deformable attachment mechanism 58 may deform, as shown in FIG. 7B, as the deformable attachment mechanism 58 passes through the aperture 40. Once the deformable attachment mechanism 58 passes through the aperture 40, as shown in FIG. 7C, the deformable attachment mechanism 58 substantially returns to its original position such that the substrate 32 and cover material 34 are disposed between the deformable attachment mechanism 58 and lens 56 to maintain the light guide 50 in a substantially constant position.

Figure 8A:
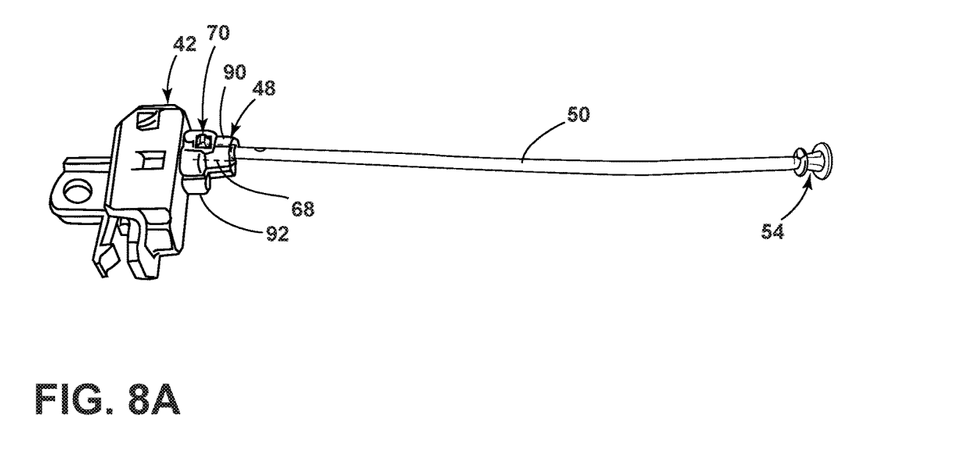
FIG. 8A is a perspective view of the light system, according to one embodiment.
Figure 8B:
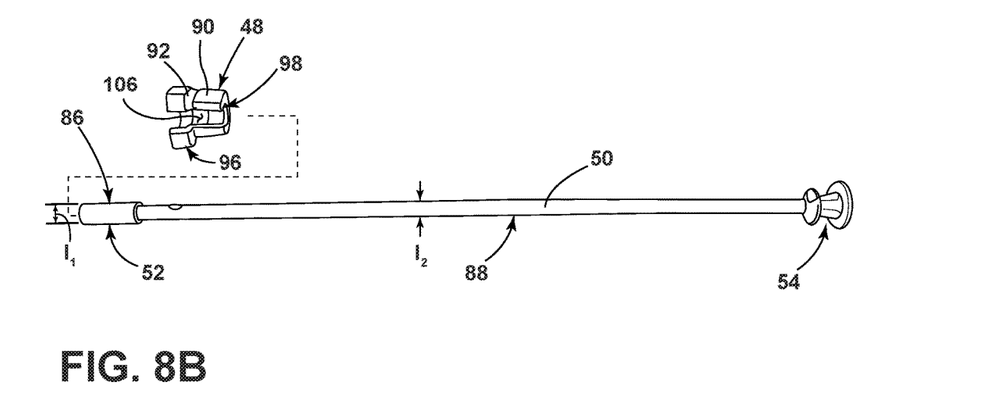
FIG. 8B is an exploded view of the light guide and connector, according to one embodiment.

Referring to FIGS. 8A and 8B, the connector 48, according to one embodiment, is configured to attach the light guide 50 to the housing 42. The proximal portion 52 of the light guide 50 defines a connector portion 86. The connector portion 86 may have a larger diameter $d_1$ than a diameter $d_2$ of a middle portion 88 of the light guide 50 that is disposed between the proximal and distal portions 52, 54. The connector portion 86 of the light guide 50 may be partially encompassed by the connector 48, as exemplarily shown in FIG. 8A.

Referring to FIGS. 8A-9D, the connector 48 includes an elongated body 90 and may additionally include one or more supports 92 that extend from the body 90. The body 90 extends along a central axis 94, in some embodiments. However, it will be appreciated that the connector 48 and/or light guide 50 may have any practicable cross-sectional geometry without departing from the scope of the present disclosure. The one or more supports 92 may rest along the housing 42 and assist in supporting the connector 48.

Figure 9A:
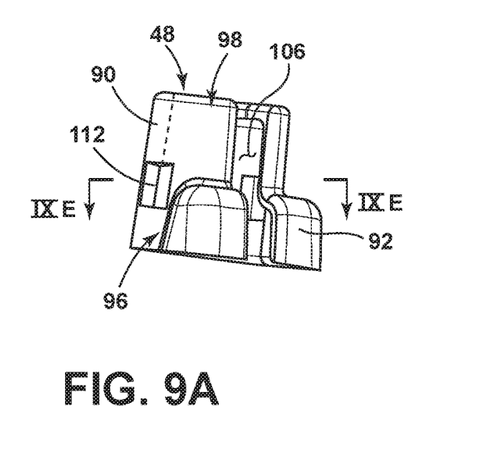
FIG. 9A is a perspective view of the connector, according to one embodiment.
Figure 9B:
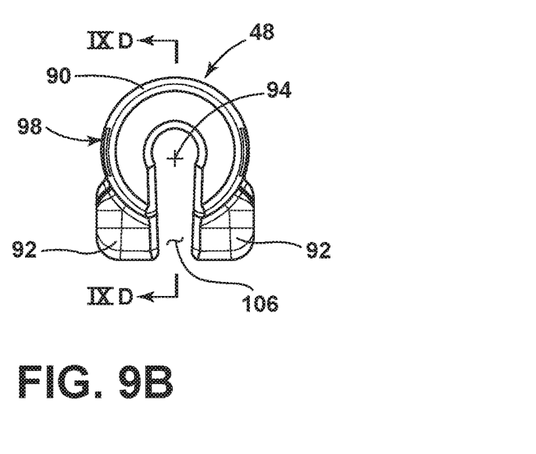
FIG. 9B is a top plan view of the connector of FIG. 9A.
Figure 9C:
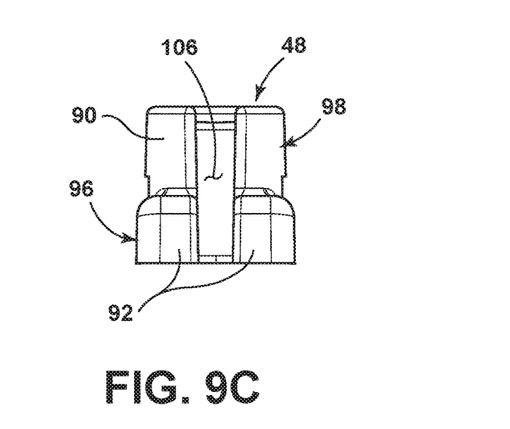
FIG. 9C is a side plan view of the connector of FIG. 9A.
Figure 9D:
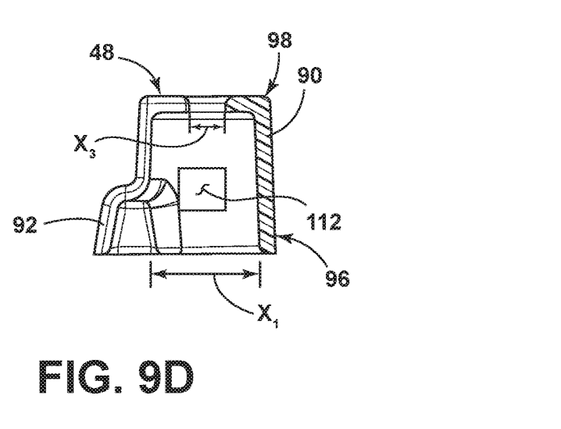
FIG. 9D is a cross-sectional view of the connector taken along the line IXD-IXD of FIG. 9A.
Figure 9E:
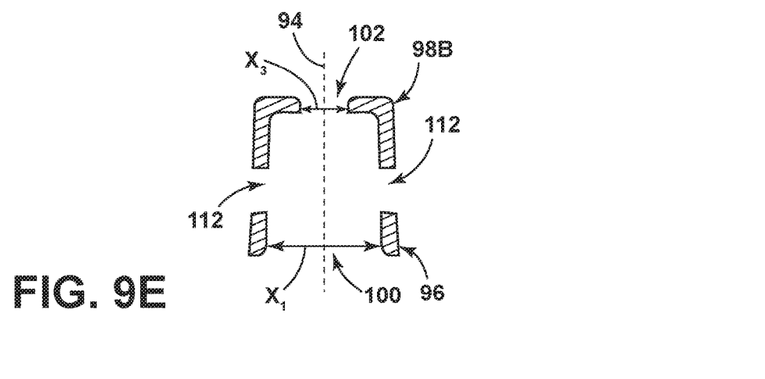
FIG. 9E is a cross-sectional view of the connector taken along the line IXE-IXE of FIG. 9A.

The body 90 of the connector 48 includes a bottom section 96 defining a first opening 100 having a diameter $x_1$ that is larger than an exterior diameter $x_2$ (FIG. 3) of the light output window 68. Thus, according to one embodiment, the connector 48 is disposed over an exterior surface 108 of the light output window 68. The connector 48 further includes a top section 98 that defines a second opening 102 having a diameter $x_3$ that is less than an inner diameter $x_4$ (FIG. 3) of the light output window 68 and/or first opening 100. Moreover, the connector portion 86 of the light guide 50 also has a diameter $l_1$ that is larger than the diameter $x_3$ of the second opening 102.

In the assembled position, the light guide 50 may be disposed within the light output window 68 and the connector 48 may be disposed over the light output window 68. The light guide 50 extends through the first and second openings 100, 102 of the connector 48. The light output window 68 may have a light output window surface 104 (FIG. 3) that extends into the light output window 68. Thus, according to one embodiment, the connector portion 86 of the light guide 50 is disposed between the light output window surface 104 and the top section 98 of the connector 48. Accordingly, the light guide 50 may be restricted from removal from the connector 48 and/or the light output window 68.

The connector 48 further defines a slot 106 that extends along the connector 48. The slot 106 may extend longitudinally and/or in a substantially parallel direction to the central axis 94. During assembly, the middle portion 88 of the light guide 50 may be slid through the slot 106 such that the connector 48 partially encompasses a portion of the light guide 50. As discussed above, the connector portion 86 and the distal portion 54 of the light guide 50 may each have larger diameters $l_1$, $y_1$, $y_2$ than the diameter $x_3$ of the second opening 102. Thus, the slot 106 allows for placement of the light guide 50 within the connector 48. The slot 106 may have a width that is equal to or larger than the diameter of the middle portion 88 of the light guide 50 such that the light guide 50 may slide through the slot 106. Additionally, and/or alternatively, the width of the slot 106 may be less than a diameter $l_2$ of the middle portion 88 of the light guide 50. The connector 48 may be configured from a resilient material, such as any practicable polymer known in the art, such that the width of the slot 106 may vary and substantially return to the original width of the slot 106 once the light guide 50 is inserted into and/or removed from the connector 48.

Referring to FIGS. 3 and 8A-9D, the snap feature 70 may be configured as one or more projections 110 on the exterior surface 108 of the light output window 68. The connector 48 defines one or more cavities 112 within the body 90. The one or more projections 110 are configured to be disposed within the one or more cavities 112 when the connector 48 is disposed over the light output window 68 to attach the connector 48 to the housing 42, as exemplarily shown in FIG. 8A. As described above, the connector 48 may be formed of a resilient material such that the width of the slot 106 may enlarge as the connector 48 is slid over the projections 110. Once the projections 110 are disposed within the cavities 112, the connector 48 may substantially return to its original configuration.

Accordingly, a light system incorporated into a trim panel, or otherwise disposed within a vehicle, has been advantageously provided herein. The light system may incorporate a flexible and/or soft touch light guide that provides both functional and decorative illumination characteristics while providing many benefits. For example, the light system provided herein may have lower production costs. Due to the flexibility of the light system provided herein, the light system may also be disposed in locations previously unobtainable due to vehicle component constraints. Lastly, the light system provided herein may provide a higher perceived quality than previously utilized light systems.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector 48 or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle light system, comprising:
   a trim member defining an aperture;
   a light guide disposed within the aperture, the light guide having a proximal portion, a distal portion, and a middle portion between the proximal and distal portions, wherein the proximal portion includes a connector portion having a diameter greater than a diameter of the middle portion of the light guide;
   a lens integrally formed with the light guide and disposed at the distal portion of the light guide; and
   a connector defining a first opening and a second opening and disposed over the connector portion of the light guide, wherein the diameter of the connector portion is less than a diameter of the second opening for securing the connector portion within an assembled position, and wherein the connector is operably coupled to a housing having a light source.

2. The vehicle light system of claim 1, wherein the light guide is formed from a flexible material.

3. The vehicle light system of claim 1, wherein the housing defines a light output window.

4. The vehicle light system of claim 3, wherein the light output window and the connector portion of the light guide have a substantially similar cross section.

5. The vehicle light system of claim 4, wherein the connector is disposed over the light output window and defines one or more cavities that interact with one or more projections disposed on the housing to attach the connector to the housing.

6. The vehicle light system of claim 1, wherein the connector defines an elongated slot.

7. The vehicle light system of claim 6, wherein the elongated slot has a width that is less than a diameter of the middle portion of the light guide.

8. A light system, comprising:
a light output window having a light output window surface therein;
a light guide having a connector portion disposed within the light output window and outwardly of the light output window surface; and
a connector defining a first opening and an opposing second opening and operably coupled to the light output window, wherein the connector portion is disposed between the light output window surface and the opposing second opening, and wherein the opposing second opening has a diameter less than a diameter of the connector portion for securing the connector portion between the light output window surface and a top section of the connector.

9. The light system of claim 8, wherein the light guide includes a body portion that extends through the opposing second opening.

10. The light system of claim 8, wherein the connector includes one or more supports that extend along a housing that is coupled to the light output window.

11. The light system of claim 8, wherein the connector is disposed over the light output window and defines one or more cavities that interact with one or more projections disposed on the light output window to attach the connector to a housing.

12. The light system of claim 8, wherein the connector defines an elongated slot.

13. The light system of claim 12, wherein the elongated slot has a width that is less than a diameter of a middle portion of the light guide.

14. The light system of claim 13, wherein the connector is formed from a resilient material and substantially returns to an original orientation after the light guide is slid through the slot.

15. A vehicle light system, comprising:
a light source housing;
a light output window coupled to the light source housing, wherein the light output window includes a snap feature;
a light guide having a connector portion; and
a connector defining a cavity and coupled to the connector portion of the light guide, wherein the connector is formed of resilient material configured to expand as the connector moves to position the snap feature within the cavity.

* * * * *